United States Patent
Fukui et al.

(10) Patent No.: US 11,739,852 B2
(45) Date of Patent: Aug. 29, 2023

(54) AIR VALVE AND FUEL CELL SYSTEM USING AIR VALVE

(71) Applicant: AISAN KOGYO KABUSHIKI KAISHA, Obu (JP)

(72) Inventors: Makoto Fukui, Nagoya (JP); Noboru Ishihara, Tokoname (JP); Shota Yamanaka, Nagoya (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 122 days.

(21) Appl. No.: 17/604,115

(22) PCT Filed: Apr. 9, 2020

(86) PCT No.: PCT/JP2020/016044
§ 371 (c)(1),
(2) Date: Oct. 15, 2021

(87) PCT Pub. No.: WO2020/213518
PCT Pub. Date: Oct. 22, 2020

(65) Prior Publication Data
US 2022/0221071 A1    Jul. 14, 2022

(30) Foreign Application Priority Data
Apr. 17, 2019  (JP) ................. 2019-078708

(51) Int. Cl.
*F16K 11/16* (2006.01)
*F16K 31/524* (2006.01)
(Continued)

(52) U.S. Cl.
CPC ...... *F16K 11/165* (2013.01); *F16K 31/52441* (2013.01); *H01M 8/04126* (2013.01); *H01M 8/04753* (2013.01); *H01M 8/04835* (2013.01)

(58) Field of Classification Search
None
See application file for complete search history.

(56) References Cited

U.S. PATENT DOCUMENTS 7,992,589 B2   8/2011 Albert et al.
8,074,628 B2  12/2011 Albert et al.
(Continued)

FOREIGN PATENT DOCUMENTS

CN   1717833 A    1/2006
JP   2002-266664 A  9/2002
(Continued)

OTHER PUBLICATIONS

Written Opinion for PCT/JP2020/016044 dated Jun. 23, 2020 (6 pages).
(Continued)

*Primary Examiner* — Haroon S. Sheikh
(74) *Attorney, Agent, or Firm* — Shumaker, Loop & Kendrick, LLP

(57) ABSTRACT

The air valve includes a supply valve configured to open and close an air supply passage through which the air gas to be supplied to the fuel cell stack from outside flows; a switching valve configured to switch between a state in which the air gas supplied from the outside flows through the air supply passage and a state in which the air gas supplied from the outside flows through a bypass passage that branches from the air supply passage; and a link mechanism connected to the supply valve and the switching valve and configured to actuate the supply valve and the switching valve. The link mechanism includes an arm portion fixed at the supply valve; and a cam plate fixed at the switching valve, wherein the cam plate includes a guide portion with which the arm portion is to contact.

16 Claims, 9 Drawing Sheets

(51) Int. Cl.
    *H01M 8/04119*    (2016.01)
    *H01M 8/04746*    (2016.01)
    *H01M 8/04828*    (2016.01)

(56) References Cited

U.S. PATENT DOCUMENTS

| | | |
|---|---|---|
| 8,684,033 B2 | 4/2014 | Albert et al. |
| 8,905,009 B2 | 12/2014 | Moritani et al. |
| 2006/0166056 A1 | 7/2006 | Nakamura et al. |
| 2012/0145134 A1 | 6/2012 | Miyazaki et al. |
| 2015/0176548 A1 | 6/2015 | Schroder |

FOREIGN PATENT DOCUMENTS

| | | | |
|---|---|---|---|
| JP | 2009-534615 A | 9/2009 |
| JP | 2011-236888 A | 11/2011 |
| JP | 2012-062826 A | 3/2012 |
| JP | 2012-122425 A | 6/2012 |
| JP | 2012-237306 A | 12/2012 |
| JP | 2013-044410 A | 3/2013 |
| JP | 2018-097951 A | 6/2018 |
| JP | 2018-137150 A | 8/2018 |

OTHER PUBLICATIONS

International Search Report (ISR) for PCT/JP2020/016044 dated Jun. 23, 2020 (5 pages).
Chinese Office Action for CN App. No. 2020800290031 dated Feb. 23, 2023 (19 pages).

AIR VALVE AND FUEL CELL SYSTEM USING AIR VALVE

TECHNICAL FIELD

This application claims priority to Japanese Patent Application No. 2019-078708 filed on Apr. 17, 2019, the contents of which are hereby incorporated by reference into the present application. The present specification relates to an air valve and a fuel cell system using an air valve.

BACKGROUND ART

In a fuel cell system, an oxygen source (air gas) and a hydrogen source (hydrogen gas) are supplied to a fuel cell stack to generate electricity. Gas that was not used in the electricity generation is discharged to the outside of the fuel cell system as air off-gas and hydrogen off-gas. Japanese Patent Application Publication No. 2018-137150 (termed Patent Document 1 hereinafter) discloses a configuration of an air system (passage for supplying air gas to a fuel cell stack) in a fuel cell system. In the fuel cell system of Patent Document 1, air gas (outside air) is supplied to a fuel cell stack by using a compressor. A valve (an inlet sealing valve) is arranged on an air supply passage that connects the compressor to the fuel cell stack, and a flow rate of the air gas to be supplied to the fuel cell stack is thereby adjusted. Another valve (an outlet integrated valve) is arranged on an air discharge passage for discharging air off-gas, and a flow rate of the air off-gas is thereby adjusted. Further, the air supply passage is connected to the air discharge passage via a bypass passage, and a valve (a bypass valve) is arranged on the bypass passage. In Patent Document 1, the air gas is supplied from the air supply passage to the air discharge passage through the bypass passage to adjust the pressure in the air supply passage (adjust the difference between the pressure frontward of the inlet sealing valve and the pressure rearward of the inlet sealing valve).

SUMMARY OF INVENTION

As disclosed in Patent Document 1, connecting the bypass passage to the air supply passage enables the air gas in the air supply passage to be supplied not only to the fuel cell stack but also to a member other than the fuel cell stack. However, supplying the air gas in the air supply passage to multiple sites (the fuel cell stack and the member other than the fuel cell stack) requires a valve to be arranged on the bypass passage and also requires an actuator (a motor, etc.) that actuates the valve. This increases the number of components in the fuel cell system and also increases the size of the fuel cell system. The present specification provides a valve (an air valve) that can achieve a compact fuel cell system.

A first technique disclosed in the present specification is an air valve that is arranged in an air system of a fuel cell stack and is configured to control a flow of air gas to be supplied to the fuel cell stack. The air valve may comprise a supply valve configured to open and close an air supply passage through which the air gas to be supplied to the fuel cell stack from outside flows; a switching valve configured to switch between a state in which the air gas supplied from the outside flows through the air supply passage and a state in which the air gas supplied from the outside flows through a bypass passage that branches from the air supply passage and bypasses a member arranged downstream of the air valve; and a link mechanism connected to the supply valve and the switching valve and configured to actuate the supply valve and the switching valve. The link mechanism may comprise an arm portion fixed at the supply valve and a cam plate fixed at the switching valve, wherein the cam plate includes a guide portion with which the arm portion is to contact. In this air valve, the guide portion may comprise a first region that is a region where the arm portion moves for an opening-closing movement of the supply valve; and a second region that is independent from the first region and is a region where the arm portion moves for an opening-closing movement of the switching valve.

A second technique disclosed in the present specification is the air valve according to the first technique, wherein a third region may be arranged between the first region and the second region and the third region is a region where neither of the opening-closing movement of the supply valve nor the opening-closing movement of the switching valve is performed.

A third technique disclosed in the present specification is the air valve according to the first or second technique, wherein the cam plate may be fixed to a cam gear connected to a motor. The cam gear may be biased in a direction in which the cam gear rotates when the supply valve is opened, such that the arm portion is in contact with the first region while the supply valve is closed.

A fourth technique disclosed in the present specification is the air valve according to any one of the first to third techniques, wherein the second region may comprise a contact portion that has an arc shape of which distance from a rotation center of the cam plate is constant. The arm portion may move in contact with the contact portion while the switching valve is actuated.

A fifth technique disclosed in the present specification is the air valve according to any one of the first to fourth techniques, wherein the cam plate may comprise a fitting portion configured to fit with the arm portion when the supply valve is closed. The fitting portion may be a groove recessed in a radially inward direction of the cam plate.

A sixth technique disclosed in the present specification is the air valve according to any one of the first to fifth techniques, wherein the first region may comprise a straight portion configured to contact the arm portion while the supply valve is closed. The straight portion may be maintained in a contact state with the arm portion for a predetermined period from an opening start of the supply valve.

A seventh technique disclosed in the present specification is the air valve according to any one of the first to sixth techniques, wherein a length of the second region may be longer than a length of the first region.

An eighth technique disclosed in the present specification is a fuel cell system comprising the air valve according to any one of the first to seventh techniques. In the fuel cell system, a humidifier may be arranged between the air valve and the fuel cell stack, and the bypass passage may be connected to the air supply passage and bypass the humidifier. Further, the switching valve may contact an inner wall of the air supply passage to block the air supply passage between the supply valve and the humidifier when the supply valve is closed.

A ninth technique disclosed in the present specification is the fuel cell system according to the eighth technique, wherein the air valve may comprise a tubular first flow section connected to the air supply passage at a position upstream of the supply valve; and an air flow section, wherein one end thereof is connected to the air supply passage at a position downstream of the supply valve, another end thereof is connected to the bypass passage, and an intermediate portion thereof is connected to the first flow section. Further, a downstream end of the supply valve may be located closer to the one end of the air flow section than an upstream end of the supply valve when the supply valve is fully open.

Advantageous Effects of Invention

According to the first technique, it is possible to control both the flow rate of fluid flowing in the air supply passage and the flow rate of fluid flossing in the bypass passage with the single air valve. That is, the number of actuators can be reduced as compared to a configuration in which valves (valve bodies and actuators that actuate the valves) are arranged separately on the air supply passage and the bypass passage. Thus, the number of components in the fuel cell system can be reduced and downsizing of the fuel cell system can be achieved. As long as one end of the bypass passage is connected to the air supply passage (the bypass passage branches from the air supply passage), another end thereof may be connected to any appropriate position. For example, in a case where a device etc. is connected to the air supply passage between the air valve and the fuel cell stack, the other end of the bypass passage may be connected to a position downstream of the device etc. (connected to the air supply passage between the device etc. and the fuel cell stack). That is, the bypass passage may bypass the device etc. arranged on the air supply passage between the air valve and the fuel cell stack. Alternatively, the other end of the bypass passage may be connected to a position downstream of the fuel cell stack (air discharge passage). That is, the bypass passage may bypass the fuel cell stack.

According to the second technique, it is ensured that the supply valve and the switching valve are prevented from being actuated simultaneously. As a result, an amount of the air gas to travel to the fuel cell stack through the air supply passage and an amount of the air gas to flow through the bypass passage can be adjusted after an amount of the air gas introduced to the air supply passage from the outside has stabilized.

According to the third technique, it is ensured that the arm portion is in contact with the cam plate while the supply valve is closed. In other words, according to the third technique, there is no gap (no play) between the arm portion and the cam plate and the opening degree of the valve (the supply valve, the switching valve) can be detected accurately. The cam gear may be biased in the rotational direction (in the direction in which the cam gear rotates when the supply valve is opened) by a biasing member such as a coil spring etc. or by using the output of the motor. That is, the motor may apply torque in the rotational direction of the cam gear while the supply valve is closed.

According to the fourth technique, the structure of the air valve (the cam plate) can be simplified. As described, according to the teachings disclosed in the present specification, the supply valve and the switching valve are actuated at different timings (they are not actuated simultaneously). Thus, while the supply valve is not actuated (while the arm portion is moving in the second region), the air valve simply needs to maintain the posture of the arm portion. With the second region that has the arc shape of which distance from the rotation center of the cam plate is constant, the arm portion moves in the second region without changing its posture. Since the posture of the arm portion does not change, a structure for maintaining the engagement of the arm portion with the cam plate while the arm portion moves in the second region can be omitted, and thus the structure of the cam plate can be simplified.

According to the fifth technique, it is possible to prevent the arm portion from straying from the cam plate (prevent the arm portion from disengaging from the cam plate) when the arm portion moves to an end of the first region (the position where the supply valve closes). Further, since the fitting portion (fitting groove) is a groove recessed in the radially inward direction of the cam plate, the size of the cam plate can be reduced as compared to a configuration in which the fitting portion is arranged in the circumferential direction of the cam plate.

According to the sixth technique, it is possible to reduce the change in the force applied to the arm portion from the cam plate (torque for actuating the supply valve) in the early stage of the opening of the supply valve (for a predetermined period from the opening start).

According to the seventh technique, it is possible to control with high precision the flow rate of the air gas flowing through the air supply passage and the flow rate of the air gas flowing through the bypass passage (ratio of the flow rates).

According to the eighth technique, it is possible to curtail the adhesion of the moisture (condensation water) generated by the humidifier to the supply valve while the supply valve is closed (while the fuel cell system is not in operation). It is possible to curtail the corrosion of the valve body, valve seat, sealing material, etc., and further to curtail the freezing of the valve body. Curtailing freezing of the valve body (fixing of the valve body with the valve seat) reduces torque for actuating the valve body and reduces a power consumption when the supply valve is opened.

According to the ninth technique, it is possible to make the coefficient of discharge when the air gas flows through the air supply passage larger than the coefficient of discharge when the air gas flows through the bypass passage. The air supply passage causes a larger pressure drop (passage resistance) than the bypass passage since the humidifier is arranged on the air supply passage. By making the coefficient of discharge of the air supply passage larger than the coefficient of discharge of the bypass passage, it is possible to reduce a difference between the flow rates of air gas flowing through the passages (the air supply passage, the bypass passage) when the opening degree of the switching valve is equal for the passages. That is, according to the ninth technique, it is possible to compensate the pressure drop in the air supply passage due to the humidifier being arranged thereon.

DESCRIPTION OF EMBODIMENTS (Fuel Cell System)

Figure 1:
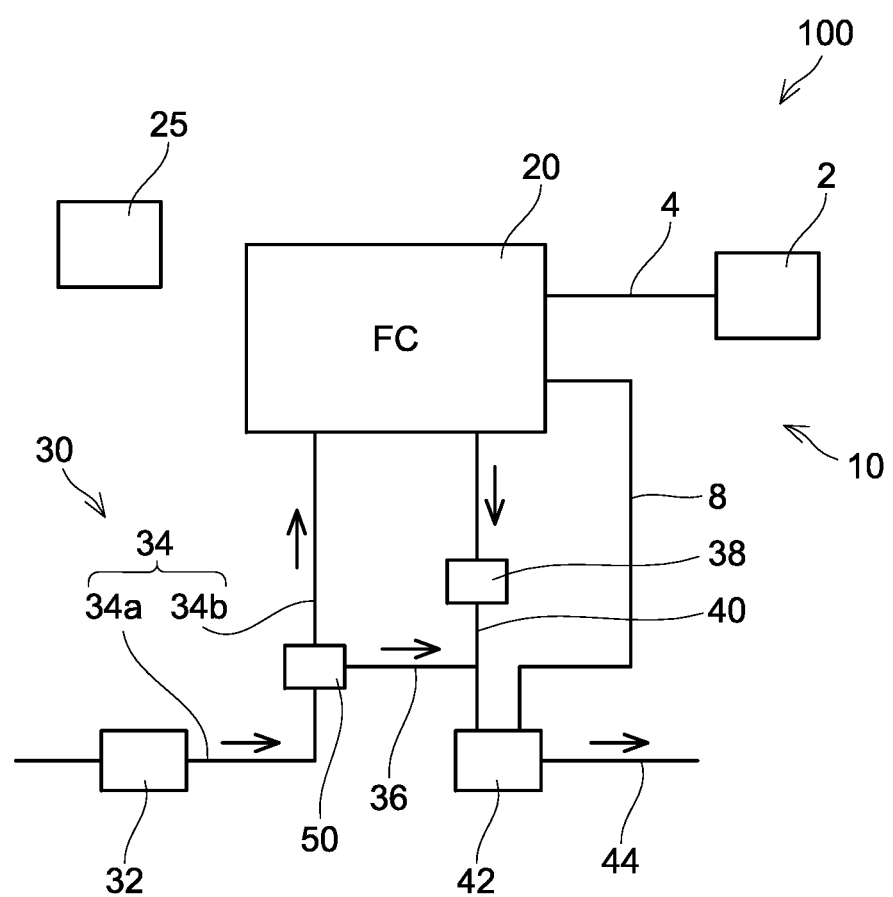
FIG. 1 illustrates a schematic diagram of a fuel cell system.

Referring to FIG. 1, a fuel cell system 100 will be described. The fuel cell system 100 comprises a fuel cell stack 20, a hydrogen system 10 that supplies hydrogen gas to the fuel cell stack 20, an air system 30 that supplies air gas (outside air) to the fuel cell stack 20, and a controller 25. In the fuel cell system 100, electricity is generated by using hydrogen gas supplied through the hydrogen system 10 and oxygen gas (air gas) supplied through the air system 30. The hydrogen system 10 comprises a hydrogen gas supply device 2, a hydrogen supply passage 4, and a hydrogen discharge passage 8. The hydrogen gas supply device 2 comprises a hydrogen tank, a regulator, an injector, etc. The hydrogen gas supply device 2 is controlled by the controller 25. The hydrogen gas supply device 2 supplies hydrogen gas to the fuel cell stack 20 through the hydrogen supply passage 4 based on a control signal of the controller 25. Hydrogen gas discharged from the fuel cell stack 20 (hydrogen off-gas) is discharged to the outside of the fuel cell system 100 through the hydrogen discharge passage 8. Although details will be described later, the hydrogen discharge passage 8 is connected to a diluter 42. The hydrogen off-gas is discharged to the outside of the fuel cell system 100 after having been diluted in the diluter 42.

The air system 30 comprises a compressor 32, an air supply passage 34, an air discharge passage 40, an FC bypass passage 36, an air supply valve 50, and an air discharge valve 38. The FC bypass passage 36 is an example of bypass passage, and the air supply valve 50 is an example of air valve. The compressor 32 pumps the outside air to the air supply passage 34 as air gas. An air cleaner (not illustrated) is arranged upstream of the compressor 32. Thus, clean air gas is supplied to the air supply passage 34. The air supply passage 34 connects the compressor 32 with the fuel cell stack 20. The air supply valve 50 is arranged on the air supply passage 34. Specifically, the air supply passage 34 comprises an upstream air supply passage 34a that connects the compressor 32 with the air supply valve 50 and a downstream air supply passage 34b that connects the air supply valve 50 with the fuel cell stack 20. When the compressor 32 is actuated and the air supply valve 50 communicates the upstream air supply passage 34a with the downstream air supply passage 34b, the outside air is supplied to the fuel cell stack 20 as air gas. Details of the air supply valve 50 will be described later.

The air discharge passage 40 is connected to the fuel cell stack 20 and discharges air off-gas from the fuel cell stack 20. The air discharge passage 40 is connected to the diluter 42. In the diluter 42, the hydrogen off-gas supplied through the hydrogen discharge passage 8 is diluted by the air off-gas supplied through the air discharge passage 40. The diluted gas is discharged to the outside of the fuel cell system 100 through a discharge pipe 44. The air discharge valve 38 is arranged on the air discharge passage 40. The air discharge valve 38 is a butterfly valve and is controlled by the controller 25. By adjusting the opening degree of the air discharge valve 38, an amount of the air off-gas to be supplied to the diluter 42 is adjusted and thus the concentration of the hydrogen off-gas is adjusted.

The FC bypass passage 36 connects the air supply passage 34 with the air discharge passage 40. Specifically, one end of the FC bypass passage 36 is connected to the air supply valve 50 and another end thereof is connected to the air discharge passage 40 at a position downstream of the air discharge valve 38. When the air supply valve 50 connects the air supply passage 34 (the upstream air supply passage 34a) to the FC bypass passage 36, the air gas in the air supply passage 34 is supplied to the air discharge passage 40. The FC bypass passage 36 is a passage that bypasses the fuel cell stack 20 and connects the air supply passage 34 with the air discharge passage 40.

(Air Supply Valve)

Figure 2:
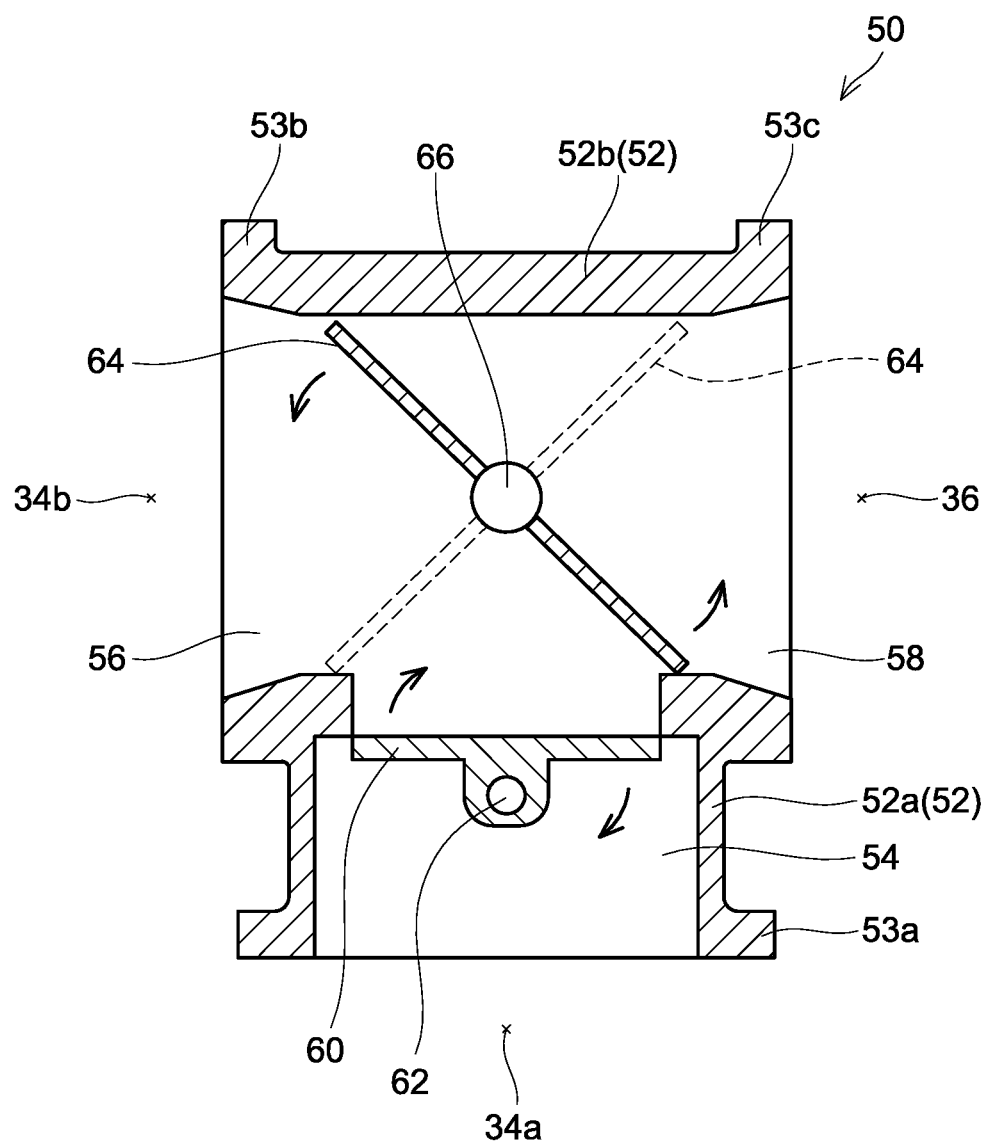
FIG. 2 illustrates an internal structure of an air supply valve.
Figure 3:
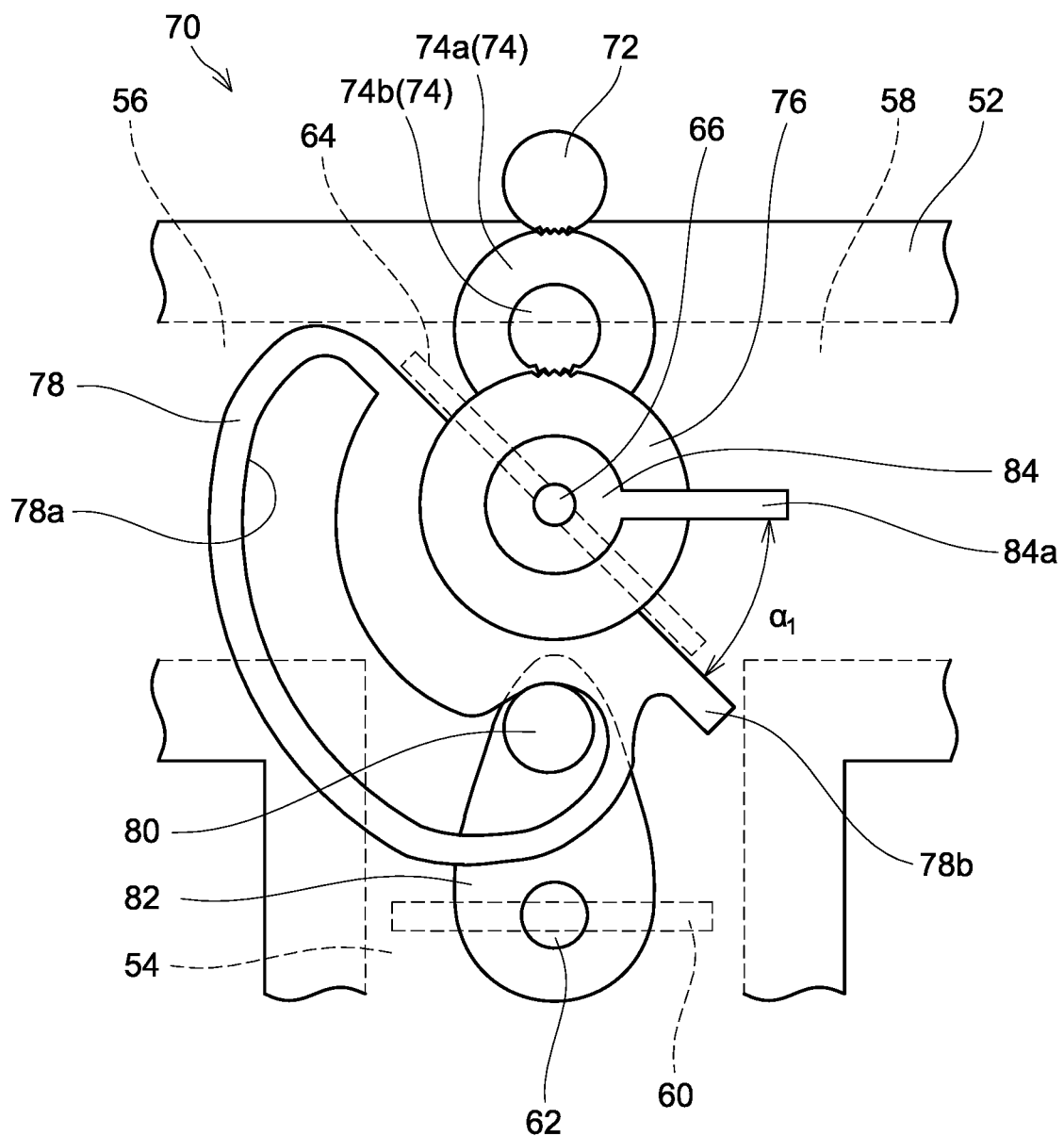
FIG. 3 illustrates a schematic diagram of a link mechanism configured to actuate valve bodies.

Referring to FIGS. 2 and 3, the air supply valve 50 will be described. FIG. 2 illustrates an internal structure of the air supply valve 50 (air flow section 52). FIG. 3 illustrates a valve actuator 70 that actuates valve bodies 60, 64 in the air flow section 52. The valve actuator 70 is an example of link mechanism. As illustrated in FIGS. 2 and 3, the air supply valve 50 comprises the air flow section 52 through which the air gas supplied from the compressor 32 flows, the valve bodies 60, 64 that change flow passages in the air flow section 52, and the valve actuator 70 that actuates the valve bodies 60, 64. The valve actuator 70 is arranged outside the air flow section 52. First, the structure in the air flow section 52 will be described.

As illustrated in FIG. 2, the air flow section 52 comprises a tubular first flow section 52a connected to the upstream air supply passage 34a and a tubular second flow section 52b. One end of the second flow section 52b is connected to the downstream air supply passage 34b and another end thereof is connected to the FC bypass passage 36. A flange 53a is formed at one end of the first flow section 52a and is connected to the upstream air supply passage 34a. Another end of the first flow section 52a is connected to an axially intermediate portion of the second flow section 52b, more specifically an axially central portion of the second flow section 52b. The first flow section 52a and the second flow section 52b are in communication with each other, and their cross-sectional shape (flow passage shape) is substantially a T-shape.

The first valve body 60 is arranged at the other end side of the first flow section 52a. The first valve body 60 is an example of supply valve. The first valve body 60 is connected to a first shaft 62 and rotates with rotation of the first shaft 62. The first valve body 60 can control the flow rate of the air gas to be supplied from the first flow section 52a to the second flow section 52b. That is, by rotating the first valve body 60, the flow rate of the air gas flowing through a first flow passage 54 in the first flow section 52a (flow rate of the air gas to be supplied to the second flow section 52b) can be varied. The first valve body 60 can be considered as a valve that varies the total flow rate of the air gas to be supplied to the downstream air supply passage 34b and the FC bypass passage 36, which will be described later.

A flange 53b is formed at the one end of the second flow section 52b and is connected to the downstream air supply passage 34b. A flange 53c is formed at the other end of the second flow section 52b and is connected to the FC bypass passage 36. The second valve body 64 is arranged at the central portion of the second flow section 52b. The second valve body 64 is an example of switching valve. The second valve body 64 is connected to a second shaft 66 and rotates with rotation of the second shaft 66. The second valve body 64 can control the flow direction of the air gas supplied to the second flow section 52b from the first flow section 52a. The air supply valve 50 can be considered as comprising both a supply valve (the first valve body 60) and a switching valve (the second valve body 64).

When the second valve body 64 is in the state indicated with the solid line in FIG. 2, the air gas supplied from the first flow section 52a to the second flow section 52b flows through a second flow passage 56 and the downstream air supply passage 34b and is then supplied to the fuel cell stack 20. When the second valve body 64 is in the state indicated with the broken line in FIG. 2, the air gas supplied from the first flow section 52a to the second flow section 52b flows through a third flow passage 58 and the FC bypass passage 36 and is then supplied to the air discharge passage 40 (also see FIG. 1). When the second valve body 64 is controlled such that it takes a middle position between the solid line and the broken line, the air gas can be supplied to both the fuel cell stack 20 and the air discharge passage 40. The second valve body 64 can be considered as a valve that varies a percentage of air gas to be directly supplied to the fuel cell stack 20 out of the air gas supplied from the compressor 32 to the air supply valve 50.

(Valve Actuator)

As shown in FIG. 3, the valve actuator 70 is arranged outside the air flow section 52. In FIG. 3, the internal structure of the air flow section 52 (the valve bodies 60, 64, the flow passages 54, 56, 58) is indicated with broken lines. The valve actuator 70 is housed in the same housing (not shown) in which the air flow section 52 is housed. The valve actuator 70 comprises a motor gear 72 fixed on an output shaft of a motor (not illustrated), a first gear 74, a second gear 76, a cam (cam plate) 78, a first arm 82, and a second arm 84. The second gear 76 is an example of cam gear. The first gear 74 is a dual gear, in which a large-diameter gear 74a is engaged with the motor gear 72 and a small-diameter gear 74b is engaged with the second gear 76. The second gear 76 is fixed to the cam 78. The number of teeth of the large-diameter gear 74a is greater than the number of teeth of the motor gear 72, and the number of teeth of the second gear 76 is greater than the number of teeth of the small-diameter gear 74b. Thus, output torque of the motor can be increased (rotational speed of the motor can be reduced) by the motor gear 72, the first gear 74, and the second gear 76. The use of the gears 74, 76 allows the motor to actuate (rotate) the cam 78 even when the motor is of small size (low torque).

The cam 78 includes a cam groove 78a, and a roller 80 arranged in the cam groove 78a. The roller 80 is movable along the cam groove 78a and is rotatably supported on the first arm 82. The roller 80 and the first arm 82 are an example of arm portion. The first arm 82 is fixed on the first shaft 62 and rotates in response to the movement (rotation) of the cam 78. When the first arm 82 rotates, the first shaft 62 rotates and the first valve body 60 rotates. The first arm 82 rotates in response to the rotation of the cam 78 until the cam 78 rotates by a predetermined angle, whereas it does not rotate, even when the cam 78 rotates, after the rotation angle of the cam 78 has exceeded the predetermined angle. Specifically, the first arm 82 rotates in response to the rotation of the cam 78 until the first valve body 60 rotates so that it shifts from a state in which the first valve body 60 closes the first flow passage 54 to a state in which the first valve body 60 opens (fully opens) the first flow passage 54, whereas the first arm 82 does not rotate, even when the cam 78 rotates, after the first valve body 60 has shifted to the state in which it opens the first flow passage 54. That is, the first valve body 60 does not rotate after the rotation angle of the cam 78 has exceeded the predetermined angle. The cam 78 comprises a second arm actuating portion 78b for actuating the second arm 84, which will be described later.

The second arm 84 is fixed on the second shaft 66. The rotation axis of the second arm 84 (the second shaft 66) is the same as the rotation axis of the second gear 76. However, the second arm 84 is not fixed to the second gear 76 (nor the cam 78 fixed to the second gear 76). The second arm 84 therefore does not integrally rotate with the second gear 76 nor the cam 78. However, the second arm 84 rotates with the rotation of the cam 78 after the rotation angle of the cam 78 has exceeded the predetermined angle. When the second arm 84 rotates, the second shaft 66 rotates and the second valve body 64 rotates. The valve actuator 70 actuates the first arm 82 and the second arm 84 with a single motor, without using separate motors for actuating the first arm 82 and the second arm 84.

The second arm 84 comprises a contact portion 84a configured to contact the second arm actuating potion 78b. When the second gear 76 (the cam 78) rotates by the predetermined angle and the second arm actuating portion 78b contacts the contact portion 84a, the second arm 84 rotates with the rotation of the second gear 76 (the cam 78). Specifically, as illustrated in FIG. 3, when the first valve body 60 closes the first flow passage 54, the second arm actuating portion 78b is offset from the contact portion 84a by an angle $\alpha 1$ with respect to the second shaft 66 (the rotation axis of the second gear 76). Thus, the second arm 84 (the second valve body 64) does not rotate until the second gear 76 (the cam 78) rotates by the angle $\alpha 1$, whereas it starts rotating once the rotation angle of the second gear 76 exceeds the angle $\alpha 1$. The second arm 84 is biased with a spring (not illustrated) such that the second valve body 64 is in the state illustrated in FIG. 3 (in the state in which the second valve body 64 fully opens the second flow passage 56). Therefore, while the second arm actuating portion 78b is not in contact with the contact portion 84a, the second flow passage 56 is fully open. Hereinafter, operation of the air supply valve 50 (how the first valve body 60 and the second valve body 64 move when the valve actuator 70 is in operation) will be described in detail.

(Operation of Air Supply Valve)

Figure 4:
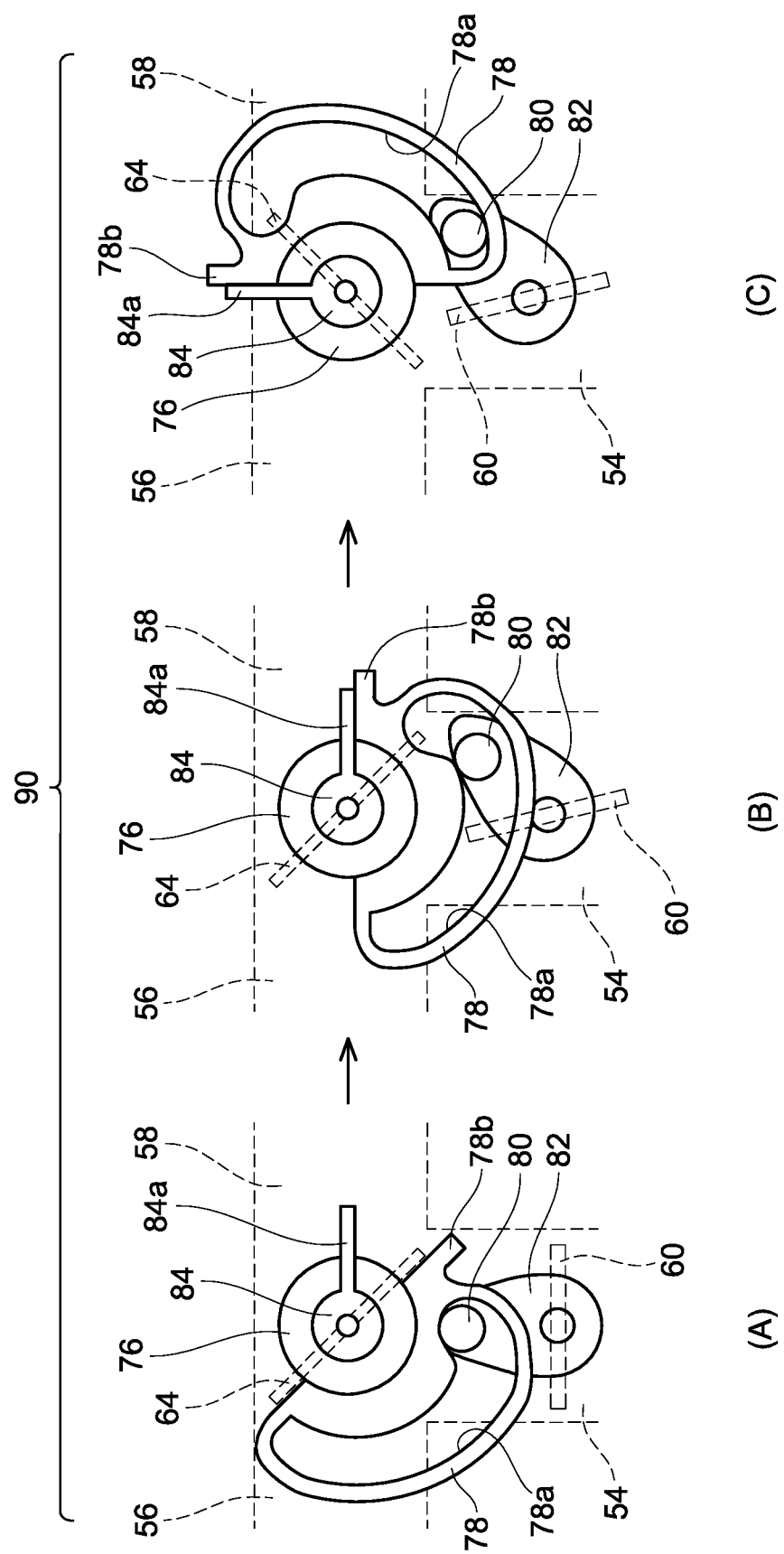
FIG. 4 illustrates explanatory diagrams for operations of the air supply valve.

Referring to FIG. 4, an operation 90 of the air supply valve 50 will be described. In FIG. 4, the gears 72, 74 in FIG. 3 are not illustrated. A state (A) illustrates a state in which the air supply valve 50 is closed. That is, in the state (A), the first valve body 60 closes the first flow passage 54, the air gas does not flow through the second flow passage 56 nor the third flow passage 58, and the air gas is not supplied to the downstream air supply passage 34b nor the FC bypass passage 36 (the fuel cell stack 20 nor the air discharge passage 40).

A state (B) illustrates a state in which the second gear 76 (the cam 78) has rotated by the angle $\alpha 1$ (see FIG. 3), the roller 80 has moved within the cam groove 78a, and the first valve body 60 has rotated so that the first flow passage 54 is fully open. In the state (B), the second arm actuating portion 78b is in contact with the contact portion 84a. Therefore, when the second gear 76 further rotates, the second arm 84 rotates and the second valve body 64 rotates. In other words, during the transition from the state (A) to the state (B), the second flow passage 56 is open and the third flow passage 58 is closed since the second valve body 64 does not rotate. Thus, during the transition from the state (A) to the state (B), the air gas is supplied only to the downstream air supply passage 34b and is not supplied to the FC bypass passage 36. That is, during the transition from the state (A) to the state (B), the air gas supplied to the air supply valve 50 from the compressor 32 is supplied only to the fuel cell stack 20.

A state (C) illustrates a state in which the second arm 84 (the second valve body 64) has rotated with the second gear 76 (the cam 78) so that the second flow passage 56 is closed and the third flow passage 58 is fully open. In the state (C), the air gas is supplied only to the FC bypass passage 36 and is not supplied to the downstream air supply passage 34b. That is, in the state (C), the air gas supplied to the air supply valve 50 from the compressor 32 is supplied only to the air discharge passage 40. During the transition from the state (B) to the state (C), the first valve body 60 does not rotate and the first flow passage 54 remains fully opened. Therefore, during the transition from the state (B) to the state (C), the flow rate of the air gas flowing through the first flow passage 54 (the total flow rate of the air gas flowing through the second flow passage 56 and the third flow passage 58) does not change, whereas the ratio of the flow rate of the air gas supplied to the fuel cell stack 20 and the flow rate of the air gas supplied to the air discharge passage 40 changes.

In the air supply valve 50, the state of the air supply valve 50 transitions from the state (A), through the state (B), to the state (C) in this order with the rotation of the single motor. Thus, in the air supply valve 50, the use of only one motor allows switching among the following states for the downstream air supply passage 34b and the FC bypass passage 36: the state in which the downstream air supply passage 34b and the FC bypass passage 36 are both closed (the state (A)); the state in which only the downstream air supply passage 34b is open and the FC bypass passage 36 is closed (from the state (A) to the state (B)); the state in which the downstream air supply passage 34b and the FC bypass passage 36 are both open and the ratio of the air gas flowing through the both passages 34b, 36 changes (from the state (B) to the state (C)); and the state in which only the FC bypass passage 36 is open and the downstream air supply passage 34b is closed (the state (C)).

As described, during the transition from the state (B) to the state (C), the roller 80 moves within the cam groove 78a as the second gear 76 (the cam 78) rotates, whereas the first arm 82 does not rotate. This occurs because the distance from the rotation axis of the second gear 76 (the cam 78) to the roller 80 does not change during the transition from the state (B) to the state (C) (because the cam groove 78a in which the roller 80 moves is on an arc of the rotation axis of the second gear 76). To the contrary, during the transition from the state (A) to the state (B), the first arm 82 rotates as the roller 80 moves. This occurs because the distance from the rotation axis of the second gear 76 (the cam 78) to the roller 80 (the position of the cam groove 78a in which the roller 80 moves) gradually increases during the transition from the state (A) to the state (B). That is, in the valve actuator 70, the cam groove 78a is formed to cause the roller 80 to move away from the rotation axis of the second gear 76 until the second gear 76 (the cam 78) rotates by the angle α1 and also to cause the roller 80 to be positioned at a constant distance from the rotation axis of the second gear 76 after the second gear 76 (the cam 78) has rotated by the angle α1.

The timings when the first valve body 60 and the second valve body 64 are actuated can be adjusted by changing the shape of the cam groove 78a. For example, it is possible to prohibit the second valve body 64 from moving for a predetermined period (for a period in which the second gear 76 rotates by a predetermined rotation angle) after the first valve body 60 has fully opened. Alternatively, an adjustment can be made such that the second valve body 64 starts moving before the first valve body 60 fully opens (while the opening degree of the first valve body 60 is increasing). The timings when the first valve body 60 and the second valve body 64 are actuated can be adjusted also by changing the angle α1 between the second arm actuating portion 78b and the contact portion 84a, without changing the shape of the cam groove 78a. That is, the timings when the first valve body 60 and the second valve body 64 are actuated can be adjusted in an easier manner than changing the shape of the cam groove 78a. Hereinafter, as a variant of the valve actuator 70, how the timings when the first valve body 60 and the second valve body 64 are actuated are adjusted by changing the angle α1 between the second arm actuating portion 78b and the contact portion 84a to an angle α.

(Variant)

Figure 5:
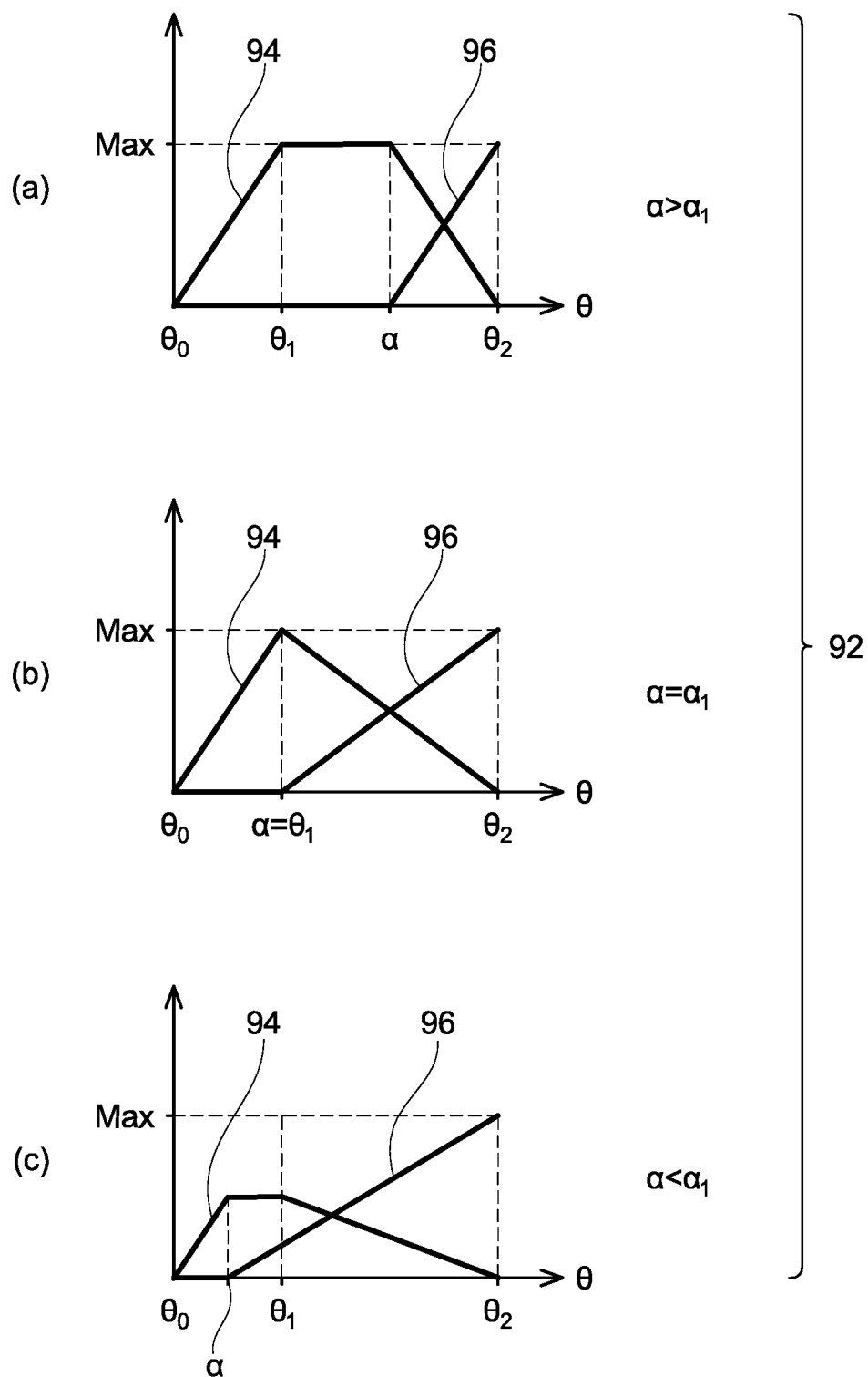
FIG. 5 illustrates passage switching timings for an air supply passage and a bypass passage.

A variant 92 of FIG. 5 illustrates relationships between rotation angles θ of the second gear 76 and flow rates of air gas supplied to the downstream air supply passage 34b and the FC bypass passage 36 (flow rates of air gas flowing through the second flow passage 56 and the third flow passage 58). Lines 94 indicate flow rates of air gas flowing through the second flow passage 56 (flow rates of air gas to be supplied to the fuel cell stack 20), and lines 96 indicate flow rates of air gas flowing through the third flow passage 58 (flow rates of air gas to be supplied to the air discharge passage 40) (also see FIGS. 1, 2).

The example (a) shows a case in which the angle α between the second arm actuating portion 78b and the contact portion 84a is smaller than the angle α1, the example (b) shows a case in which the angle α is equal to the angle α1 (i.e., the valve actuator 70), and the example (c) shows a case in which the angle α is larger than the angle α1. An angle θ0 is an angle at which the first valve body 60 closes the first flow passage 54 (corresponding to the state (A) in FIG. 4). An angle θ1 is an angle at which the opening degree of the first valve body 60 is its maximum and the total flow rate of the air gas flowing through the second flow passage 56 and the third flow passage 58 is its maximum (corresponding to the state (B) in FIG. 4). An angle θ2 is an angle at which the second valve body 64 closes the second flow passage 56 and opens only the third flow passage 58 (corresponding to the state (C) in FIG. 4).

In the example (a), when the second gear 76 rotates by the angle θ1 from its initial state (from the angle θ0), the opening degree of the first valve body 60 reaches the maximum and the flow rate of the air gas flowing through the second flow passage 56 (the line 94) reaches the maximum. Between the angle θ0 and the angle θ1, the flow rate of the air gas flowing through the second flow passage 56 increases as the opening degree of the first valve body 60 increases. In the example (a), the second arm actuating portion 78b does not contact the contact portion 84a even though the second gear 76 rotates by the angle θ1 (see the state (B) in FIG. 4 for comparison). Therefore, even though the rotation angle of the second gear 76 has reached the angle θ1, the second valve body 64 does not start rotating and the flow rate of the air gas flowing through the third flow passage 58 is "zero". The second valve body 64 starts rotating after the rotation angle of the second gear 76 reaches the angle α. Between the angle α and the angle θ2, the flow rate of the air gas flowing through the second flow passage 56 decreases and the flow rate of the air gas flowing through the third flow passage 58 (the line 96) increases. Then, when the rotation angle of the second gear 76 reaches the angle θ2, the air gas flows through only the third flow passage 58.

In the example (a), the switching between the second flow passage 56 and the third flow passage 58 is performed after the flow rate of the air gas introduced to the air supply valve 50 (the flow rate in the first flow passage 54) has been stabilized. Thus, the example (a) facilitates controlling the ratio of the flow rate of the air gas to be supplied to the downstream air supply passage 34b and the flow rate of the air gas to be supplied to the FC bypass passage 36. Further, it is possible to supply the maximum amount of air gas to the fuel cell stack 20 without controlling the rotation angle of the second gear 76 with high precision, because the period in which the air gas flows through only the second flow passage 56 can be prolonged.

The example (b) corresponds to the valve actuator 70. When the rotation angle of the second gear 76 reaches the angle α (the angle α1), the opening degree of the first valve body 60 reaches the maximum and the second valve body 64 starts rotating. Thus, when the flow rate of the air gas flowing through the second flow passage 56 (the line 94) reaches the maximum, the switching between the second flow passage 56 and the third flow passage 58 starts. That is, immediately after the flow rate of the air gas flowing through the first flow passage 54 has reached the maximum, the control over the ratio of the flow rate of the air gas to be supplied to the downstream air supply passage 34b and the flow rate of the air gas to be supplied to the FC bypass passage 36 (the line 96) starts. The example (b) is highly responsive to the flow passage switching (adjustment in the air gas amount to be supplied to the downstream air supply passage 34b and the air gas amount to be supplied to the FC bypass passage 36) in response to the rotation of the second gar 76 (drive of the motor).

In the example (c), when the rotation angle of the second gear 76 reaches the angle α, the second valve body 64 starts rotating before the opening degree of the first valve body 60 reaches the maximum (before the rotation angle of the second gear 76 reaches the angle θ1). During a period from when the rotation angle of the second gear 76 has reached the angle α to when it reaches the angle θ1, the flow rate of the air gas flowing through the second flow passage 56 (the line 94) remains constant, whereas the flow rate of the air gas flowing through the third flow passage 58 (the line 96) increases. After the angle α1, the flow rate of the air gas flowing through the second flow passage 56 decreases, whereas the flow rate of the air gas flowing through the third flow passage 58 increases. The example (c) is useful when the flow rate of the air gas to be supplied to the downstream air supply passage 34b (the fuel cell stack 20) needs to be limited.

As described, in the fuel cell system 100, the flange 53b is connected to the downstream air supply passage 34b, and the flange 53c is connected to the FC bypass passage 36. However, the flange 53b may be connected to the FC bypass passage 36, and the flange 53c may be connected to the downstream air supply passage 34b. In this case, when the motor starts, the state of the fuel cell system 100 transitions in the following order: a state in which both the downstream air supply passage 34b and the FC bypass passage 36 are closed; a state in which only the FC bypass passage 36 is open and the downstream air supply passage 34b is closed; a state in which both the downstream air supply passage 34b and the FC bypass passage 36 are open; and a state in which only the downstream air supply passage 34b is open and the FC bypass passage 36 is closed.

(Variant of Fuel Cell System)

Figure 6:
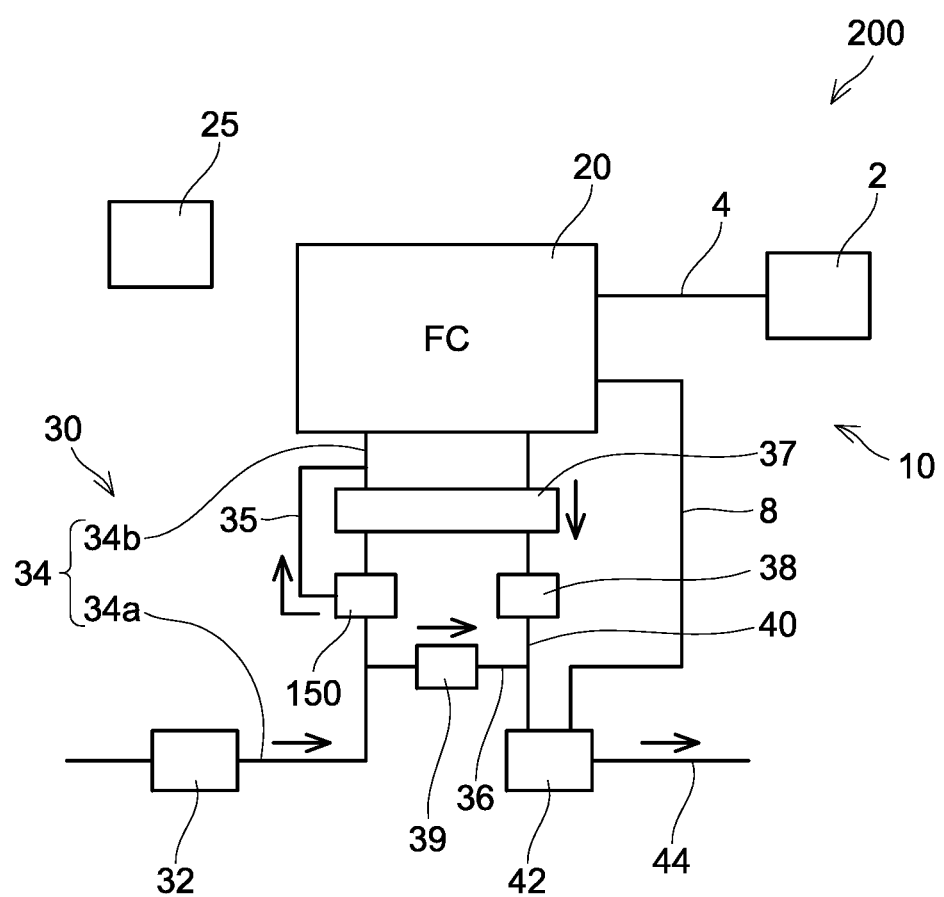
FIG. 6 illustrates a schematic diagram of a fuel cell system according to a variant.

Referring to FIG. 6, a fuel cell system 200 will be described. The fuel cell system 200 is a variant of the fuel cell system 100. Thus, elements of the fuel cell system 200 that are substantially the same as the elements of the fuel cell system 100 are indicated with the same reference signs as those of the fuel cell system 100 or indicated with reference signs of which last two digits are the same as those of the fuel cell system 100, and description for them may be omitted. In the fuel cell system 200, a humidifier 37 is arranged in an air system 30. Further, an air supply valve 150 is arranged on an air supply passage 34, an air discharge valve 38 is arranged on an air discharge passage 40, and a bypass valve 39 is arranged on an FC bypass passage 36.

The humidifier 37 is arranged on the air supply passage 34 and the air discharge passage 40. Specifically, the humidifier 37 is connected to the air supply passage 34 at a position between the air supply valve 150 and a fuel cell stack 20 and is connected to the air discharge passage 40 at a position between the fuel cell stack 20 and the air discharge valve 38. The humidifier 37 adjusts humidity (moisture content) of air to be supplied to the fuel cell stack 20 and humidity of air off-gas to be supplied to a diluter 42.

A humidifier bypass passage 35 is connected to the air supply passage 34 (downstream air supply passage 34b). The humidifier bypass passage 35 is an example of bypass passage. The humidifier bypass passage 35 bypasses the humidifier 37, and is connected to the air supply passage 34 (the downstream air supply passage 34b) at a position upstream of the humidifier 37 and at a position downstream thereof. More specifically, in the fuel cell system 200, one end (upstream end) of the humidifier bypass passage 35 is connected to the air supply valve 150 (an example of air valve). When the air supply valve 150 communicates the air supply passage 34 (the downstream air supply passage 34b) with the humidifier bypass passage 35, air gas supplied to the air supply passage 34 is supplied to the fuel cell stack 20 without flowing through the humidifier 37. On the other hand, when the air supply valve 150 communicates with the downstream air supply passage 34b, air gas supplied to the air supply passage 34 is supplied to the fuel cell stack 20 through the humidifier 37.

(Variant of Air Supply Valve)

Referring to FIGS. 7 to 10, the air supply valve 150 will be described. The air supply valve 150 is a variant of the air supply valve 50. Thus, elements of the air supply valve 150 that are substantially the same as the elements of the air supply valve 50 are indicated with the same reference signs as those of the air supply valve 50 or indicated with reference signs of which last two digits are the same as those of the air supply valve 50, and description for them may be omitted. In the fuel cell system 200, the air supply valve 50 may be used instead of the air supply valve 150. In this case, the flange 53b may be connected to the downstream air supply passage 34b and the flange 53c may be connected to the humidifier bypass passage 35. Alternatively, the flange 53b may be connected to the humidifier bypass passage 35 and the flange 53c may be connected to the downstream air supply passage 34b.

Figure 7:
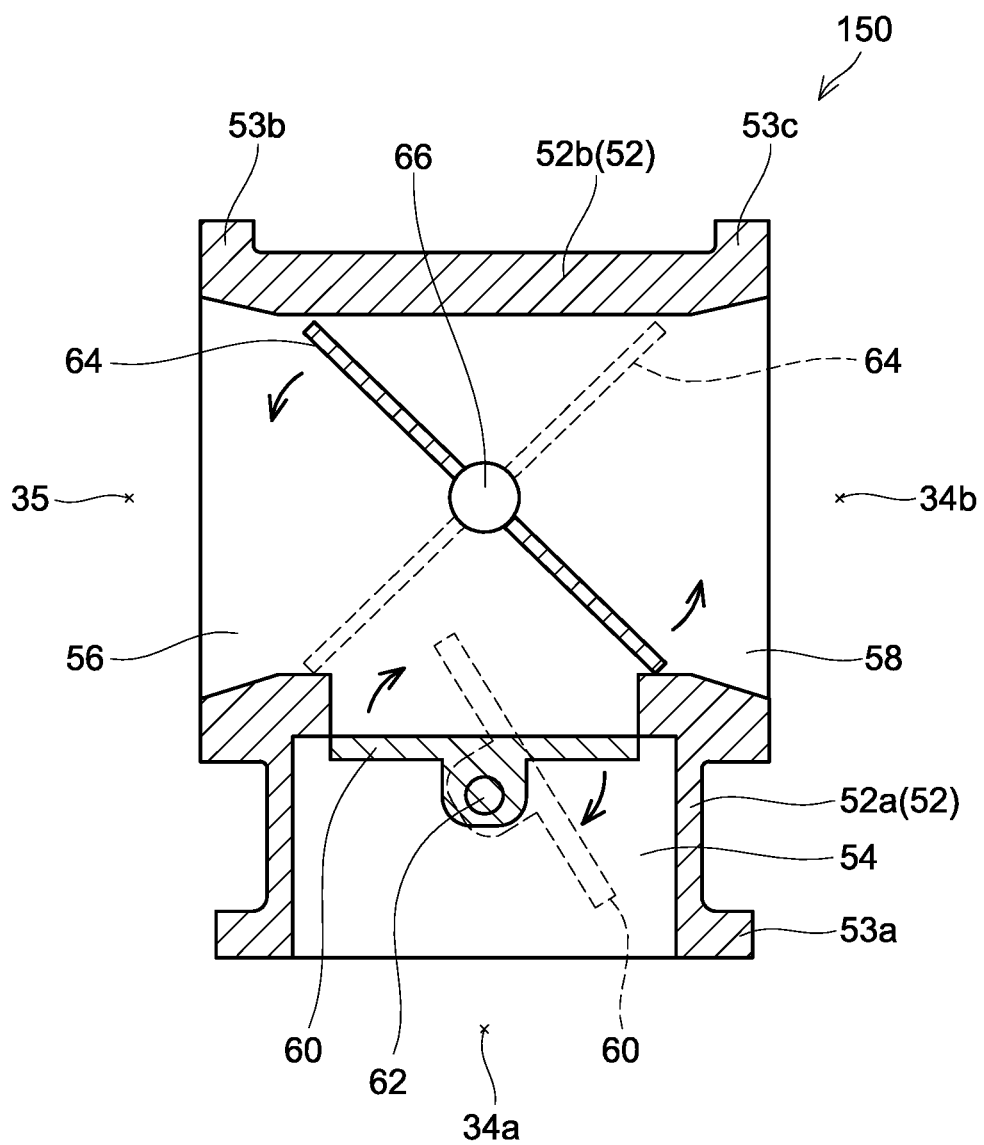
FIG. 7 illustrates an internal structure of an air supply valve according to the variant.

FIG. 7 illustrates the internal structure of the air supply valve 150. In the air supply valve 150, a flange 53b is connected to the humidifier bypass passage 35 and a flange 53c is connected to the downstream air supply passage 34b (see FIG. 2 for comparison). In FIG. 7, a state in which the air supply valve 150 is closed (air gas is not supplied to the fuel cell stack 20) is indicated with solid lines, and a state in which a first valve body 60 has rotated (the air supply valve 150 is open) and a state in which a second valve body 64 has rotated (passage through which air gas flows has been switched) are indicated with broken lines.

As illustrated in FIG. 7, in the state in which the air supply valve 150 is closed (the first valve body 60 is closed), the second valve body 64 is in contact with an inner wall of a second flow section 52b to block the air supply passage 34 (the downstream air supply passage 34b) between the first valve body 60 and the humidifier 37. The air supply valve 150 therefore prevents adhesion of moisture generated in the humidifier 37 to the first valve body 60 when the fuel cell system 200 is not in operation.

In the air supply valve 150, when the first valve body 60 is fully open (in the state indicated by the broken lines), a downstream end of the first valve body 60 is located closer to the flange 53b (side connected to the downstream air supply passage) than an upstream end thereof. This makes a coefficient of discharge when the air gas flows through the downstream air supply passage (when the second valve body 64 is in the solid line state) larger than a coefficient of discharge when the air gas flows through the humidifier bypass passage (when the second valve body 64 is in the broken line state). The air gas experiences a pressure drop by flowing through the humidifier 37. The above configuration can reduce the difference between the fluid pressure when the air gas flows through the downstream air supply passage and the fluid pressure when the air gas flows through the humidifier bypass passage, and thus improves diversion control while the second valve body 64 is actuated.

Figure 8:
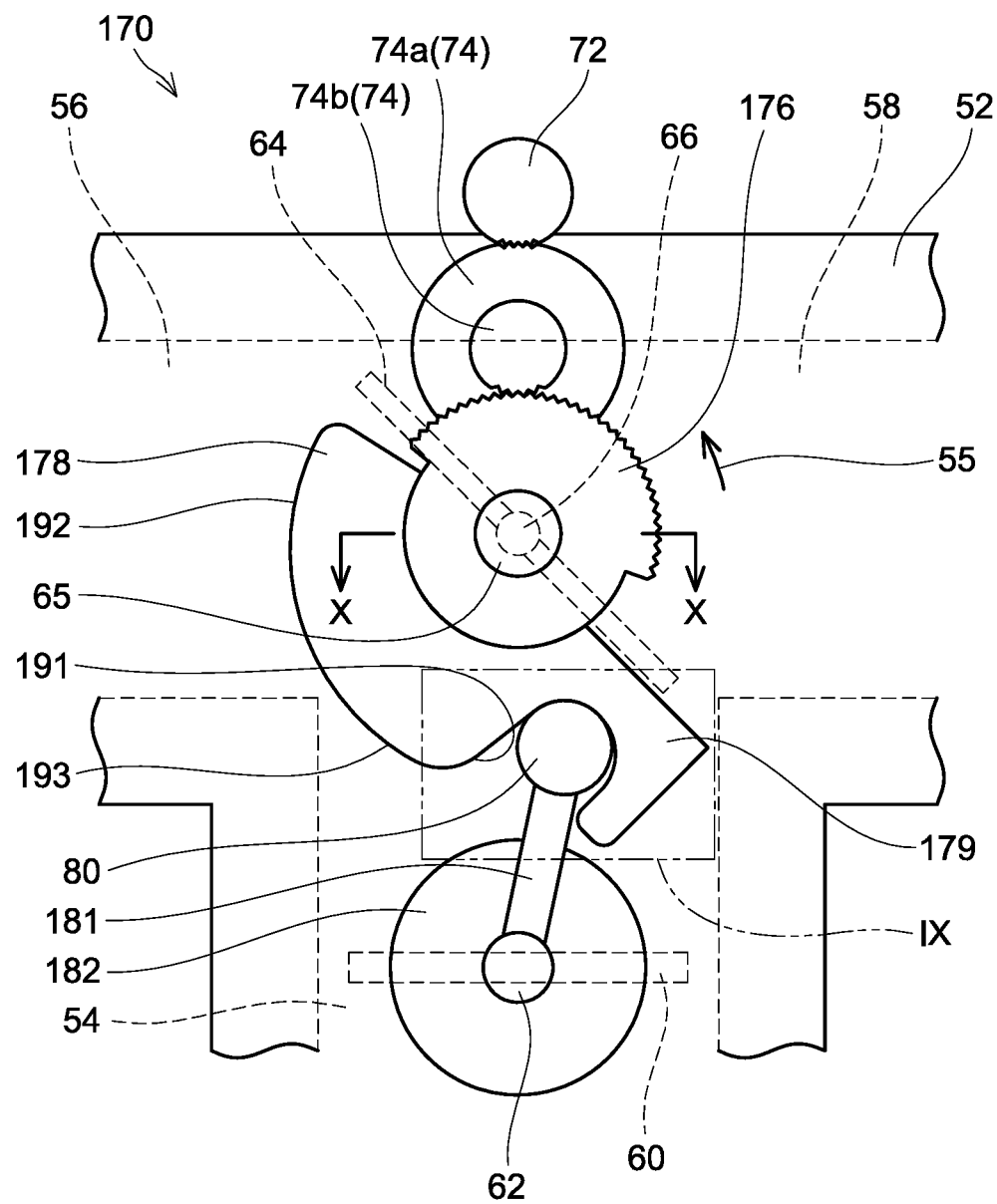
FIG. 8 illustrates a schematic diagram of a link mechanism according to the variant.

FIG. 8 illustrates a valve actuator 170 configured to actuate the valve bodies 60, 64. The valve actuator 170 is an example of link mechanism. In the valve actuator 170, a second gear 176 is engaged with a small-diameter gear 74b of a first gear 74. The second gear 176 is fixed to a cam 178 (an example of cam plate). A magnet 65 is arranged on a surface of the second gear 176. The magnet 65 faces a rotation angle detection sensor (not illustrated). The rotation angle detection sensor detects the rotation angle of the second gear 176. Further, a support member 182 that supports an arm portion 181 is fixed on a first shaft 62. A roller 80 is rotatably supported at an end of the arm portion 181.

The cam 178 comprises a fitting portion 179 in which the roller 80 is fitted when the air supply valve 150 is closed and a guide portion 180 along which the roller 80 moves while contacting it when the air supply valve 150 is open (when the first valve body 60 or the second valve body 64 are actuated). The fitting portion 179 is a groove formed by a part of the periphery of the cam 178 being recessed in a radially inward direction of the cam 178. The fitting portion 179 prevents the roller 80 from straying away from the cam 178 when the air supply valve 150 is closed (when the first valve body 60 is closed). The second gear 176 is biased in the direction indicated with an arrow 55 (in a direction that brings the air supply valve 150 to open) while the air supply valve 150 is closed. Thus, the roller 80 is maintained in a contact state with a wall surface of the fitting portion 179. A contact portion is arranged on a back surface of the second gear 176, although this is not illustrated. The contact portion is fixed on a second shaft 66 and contacts the second gear 176 (the cam 178) when the second gear 176 (the cam 178) rotates by a predetermined rotation angle.

Basic operation of the valve actuator 170 is substantially the same as that of the valve actuator 70. That is, when the second gear 176 (the cam 178) rotates, the first shaft 62 rotates and the first valve body 60 is actuated while the roller 80 is moving in a first region 191 where the distance from the rotation axis of the second gear 176 to the roller 80 gradually increases. Further, the first shaft 62 does not rotate and the first valve body 60 is not actuated while the roller 80 is moving in a second region 192 where the distance from the rotation axis of the second gear 176 is constant. While the roller 80 is moving in the second region 192, the second shaft 66 rotates and the second valve body 64 is actuated. In the valve actuator 170, a third region 193 is arranged between the first region 191 and the second region 192. The third region 193 is not involved with the actuation of first valve body 60 nor the actuation of the second valve body 64. The third region 193 can be formed by adjusting the position of the above-described contact portion fixed on the second shaft 66.

Figure 9:
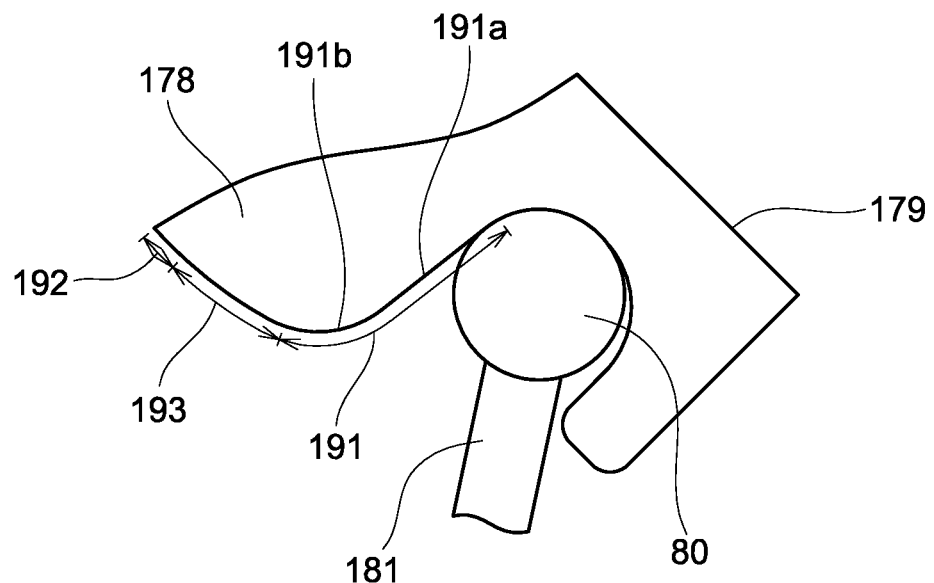
FIG. 9 illustrates an enlarged view of the area enclosed by a broken line IX in FIG. 8.

Referring to FIG. 9, the first region 191, the second region 192, and the third region 193 will be described. The first region 191 is a region from an inner surface of the fitting portion 179 (a surface thereof that is closer to the rotation axis of the cam 178 (the second gear 176)) to a site where the distance from the rotation center of the cam 178 becomes constant. In the first region 191, its curvature is not constant and the distance from the rotation center of the cam 178 varies. The second region 192 is independent (separated) from the first region 191 and has an arc shape of which distance from the rotation center of the cam 178 is constant. That is, the second region 192 has a constant curvature. The third region 193 has an arc shape of which distance from the rotation center of the cam 178 is constant, and the length of the third region 193 can be adjusted to adjust the timing when the second valve body 64 starts moving with the rotation of the second gear 176 as described. As clearly illustrated in FIGS. 8 and 9, the length of the second region 192 is longer than the length of the first region 191.

The first region 191 includes a straight portion 191a and a curve portion 191b. The curve portion 191b is arranged between the straight portion 191a and the third region 193. While the valve actuator 170 is closed, the arm portion 181 (the roller 80) is in contact with the straight portion 191a. When the valve actuator 170 is started, the arm portion 181 (the roller 80) first moves along the straight portion 191a while maintaining the contact with the first region 191. This stabilizes a force applied to the arm portion 181 (the roller 80) in an early stage after the valve actuator 170 is started (within a predetermined period from the start of the valve actuator 170). That is, torque for actuating the first valve body 60 is stabilized. For example, if the entire first region 191 is curved, it is required to control the machining accuracy (reduce dimensional variation) for the cam 178 with high precision in order to stabilize the force applied to the arm portion 181 in the early stage after the valve actuator 170 is started. The first region 191 including the straight portion 191a facilitates the machining of the first region 191 and easily stabilizes the drive torque for the first valve body 60.

Figure 10:
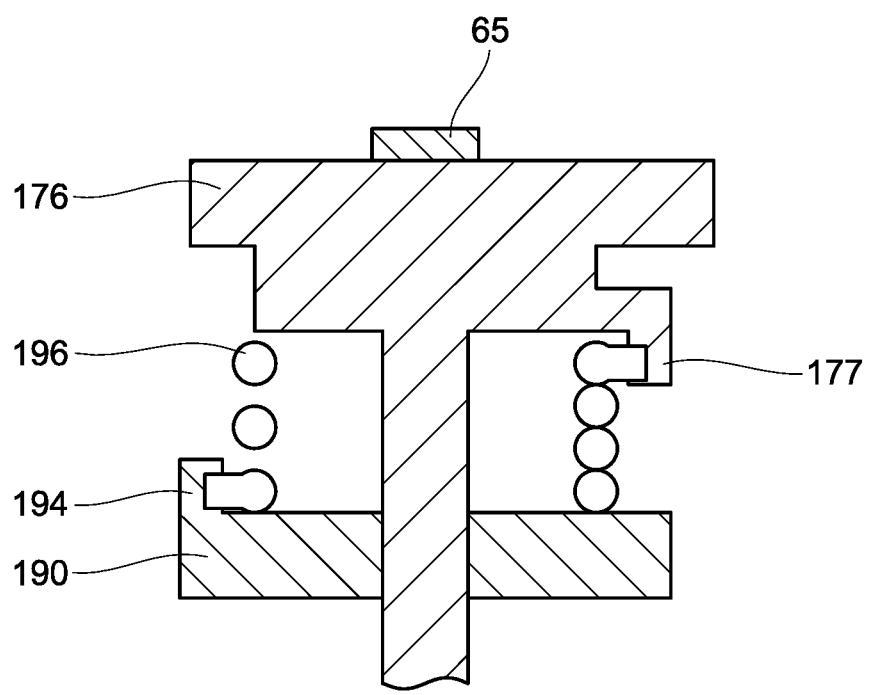
FIG. 10 illustrates a cross-sectional view along a line X-X in FIG. 8.

FIG. 10 illustrates a cross sectional view of the second gear 176. As described, the second gear 176 is biased in the direction of the arrow 55 while the air supply valve 150 is closed (also see FIG. 8). A coil spring 196 is arranged at the back surface of the second gear 176. One end of the coil spring 196 is fixed to a protruding portion 177 on the back surface of the second gear 176, and another end thereof is fixed to a protruding portion 194 of a housing 190 of the air supply valve 150. The second gear 176 is biased by the coil spring 196 in the direction of the arrow 55. Positioning the coil spring 196 between the second gear 176 and the housing 190 prevents the second gear 176 from moving in a direction of the rotation axis. The distance between the magnet 65 and the rotation angle detection sensor (not illustrated) is thereby stabilized and the rotation angle of the second gear 176 can be detected accurately.

Other Embodiments

The embodiments above describe an example in which one end of the bypass passage is connected to the air supply passage and another end thereof is connected to the air discharge passage and an example in which one end of the bypass passage is connected to the air supply passage at a position upstream of the humidifier and another end thereof is connected to the air supply passage at a position downstream of the humidifier. However, the bypass passage (the other end thereof) may not necessarily be connected as described in the embodiments. What is important in the teachings disclosed herein is that a single air valve (air supply valve) performs the switching among a state in which the air supply passage and the bypass passage are both closed, a state in which the air supply passage is open and the bypass passage is closed, and a state in which the air supply passage is closed and the bypass passage is open.

Other important points in the teachings disclosed herein are that the supply valve configured to open and close the air supply passage and the switching valve configured to switch the air supply passage and the bypass passage are actuated by the arm portion fixed at the supply valve and the link mechanism comprising the cam plate fixed at the switching valve, and that the link mechanism comprises the guide portion including the first region where the arm portion moves for the opening-closing movement of the supply valve and the second region where the arm portion moves for the opening-closing movement of the switching valve, wherein the second region is independent from the first region. Thus, the first region and the second region may be adjacent to each other, for example. That is, it is not always necessary to arrange the third region where neither of the opening-closing movement of the supply valve nor the opening-closing movement of the switching valve is performed, between the first region and the second region. Without the third region, the size of the cam plate can be reduced.

Other than a coil spring, a biasing member such as a leaf spring, a rubber block, etc. may be used to bias the cam gear (second gear) in the direction in which the cam gear rotates when the supply valve is opened. Alternatively, the biasing member may be omitted and the cam gear may be biased by the motor applying torque in the direction in which the cam gear rotates when the supply valve is opened to the cam gear while the supply valve is closed. Alternatively, the biasing member may be omitted and shape(s) of the cam plate and/or the arm portion may be changed to prevent a positional change of the cam plate and the roller (arm portion) while the air supply valve is closed.

The configuration of the cam plate is not limited to those described in the embodiments. For example, the fitting portion configured to fit with the roller (arm potion) when the supply valve is closed, the straight portion of the first region, etc. may be omitted as appropriate. The length of the first region may be longer than the length of the second region to make the actuation speed of the supply valve slower than that of the switching valve.

While specific examples of the present disclosure have been described above in detail, these examples are merely illustrative and place no limitation on the scope of the patent claims. The techniques described in the patent claims also encompasses various changes and modifications to the specific examples described above. The technical elements explained in the present specification or drawings provide technical utility either independently or through various combinations. The present disclosure is not limited to the combinations described at the time the claims are filed. Further, the purpose of the examples illustrated by the present specification or drawings is to satisfy multiple objectives simultaneously, and satisfying any one of those objectives gives technical utility to the present disclosure.

The invention claimed is:

1. An air valve arranged in an air system of a fuel cell stack and configured to control a flow of air gas to be supplied to the fuel cell stack, the air valve comprising:
a supply valve configured to open and close an air supply passage through which the air gas to be supplied to the fuel cell stack from outside flows;
a switching valve configured to switch between a state in which the air gas supplied from the outside flows through the air supply passage and a state in which the air gas supplied from the outside flows through a bypass passage, wherein the bypass passage branches from the air supply passage and bypasses a member arranged downstream of the air valve; and
a link mechanism connected to the supply valve and the switching valve and configured to actuate the supply valve and the switching valve,
wherein the link mechanism comprises:
an arm portion fixed at the supply valve; and
a cam plate including a guide portion with which the arm portion is to contact,
wherein the guide portion comprises:
a first region that is a region where the arm portion moves for an opening-closing movement of the supply valve; and
a second region that is independent from the first region and is a region where the arm portion moves for an opening-closing movement of the switching valve.

2. The air valve according to claim 1, wherein
a third region is arranged between the first region and the second region, and
the third region is a region where neither of the opening-closing movement of the supply valve nor the opening-closing movement of the switching valve is performed.

3. The air valve according to claim 2, wherein
the cam plate is fixed to a cam gear connected to a motor, and
the cam gear is biased in a direction in which the cam gear rotates when the supply valve is opened, such that the arm portion is in contact with the first region while the supply valve is closed.

4. The air valve according to claim 3, wherein
the second region comprises a contact portion that has an arc shape of which distance from a rotation center of the cam plate is constant, and
the arm portion moves in contact with the contact portion while the switching valve is actuated.

5. The air valve according to claim 4, wherein
the cam plate comprises a fitting portion configured to fit with the arm portion when the supply valve is closed, and
the fitting portion is a groove recessed in a radially inward direction of the cam plate.

6. The air valve according to claim 5, wherein
the first region comprises a straight portion configured to contact the arm portion while the supply valve is closed, and
the straight portion is maintained in a contact state with the arm portion for a predetermined period from an opening start of the supply valve.

7. The air valve according to claim 6, wherein a length of the second region is longer than a length of the first region.

8. The air valve according to claim 1, wherein
the cam plate is fixed to a cam gear connected to a motor, and the cam gear is biased in a direction in which the cam gear rotates when the supply valve is opened, such that the arm portion is in contact with the first region while the supply valve is closed.

9. The air valve according to claim 1, wherein
the second region comprises a contact portion that has an arc shape of which distance from a rotation center of the cam plate is constant, and
the arm portion moves in contact with the contact portion while the switching valve is actuated.

10. The air valve according to claim 1, wherein
the cam plate comprises a fitting portion configured to fit with the arm portion when the supply valve is closed, and
the fitting portion is a groove recessed in a radially inward direction of the cam plate.

11. The air valve according to claim 1, wherein
the first region comprises a straight portion configured to contact the arm portion while the supply valve is closed, and
the straight portion is maintained in a contact state with the arm portion for a predetermined period from an opening start of the supply valve.

12. The air valve according to claim 1, wherein a length of the second region is longer than a length of the first region.

13. A fuel cell system comprising the air valve according to claim 1, wherein
a humidifier is arranged between the air valve and the fuel cell stack,
the bypass passage is connected to the air supply passage and bypasses the humidifier, and
the switching valve contacts an inner wall of the air supply passage to block the air supply passage between the supply valve and the humidifier when the supply valve is closed.

14. A fuel cell system comprising the air valve according to claim 1, wherein
a humidifier is arranged between the air valve and the fuel cell stack,
the bypass passage is connected to the air supply passage and bypasses the humidifier, and
the air valve comprises:
a tubular first flow section connected to the air supply passage at a position upstream of the supply valve; and
an air flow section, wherein one end thereof is connected to the air supply passage at a position downstream of the supply valve, another end thereof is connected to the bypass passage, and an intermediate portion thereof is connected to the first flow section, and
a downstream end of the supply valve is located closer to the one end of the air flow section than an upstream end of the supply valve when the supply valve is fully open.

15. A fuel cell system comprising the air valve according to claim 7, wherein
a humidifier is arranged between the air valve and the fuel cell stack,
the bypass passage is connected to the air supply passage and bypasses the humidifier, and
the switching valve contacts an inner wall of the air supply passage to block the air supply passage between the supply valve and the humidifier when the supply valve is closed.

16. A fuel cell system comprising the air valve according to claim 7, wherein
a humidifier is arranged between the air valve and the fuel cell stack,
the bypass passage is connected to the air supply passage and bypasses the humidifier, and
the air valve comprises:
a tubular first flow section connected to the air supply passage at a position upstream of the supply valve; and
an air flow section, wherein one end thereof is connected to the air supply passage at a position downstream of the supply valve, another end thereof is connected to the bypass passage, and an intermediate portion thereof is connected to the first flow section, and
a downstream end of the supply valve is located closer to the one end of the air flow section than an upstream end of the supply valve when the supply valve is fully open.

* * * * *